July 4, 1939. C. OPOLO 2,164,470
ANTIVIBRATION SUSPENSION AND STEERING GEAR FOR VEHICLES
Filed Dec. 11, 1935 3 Sheets-Sheet 1
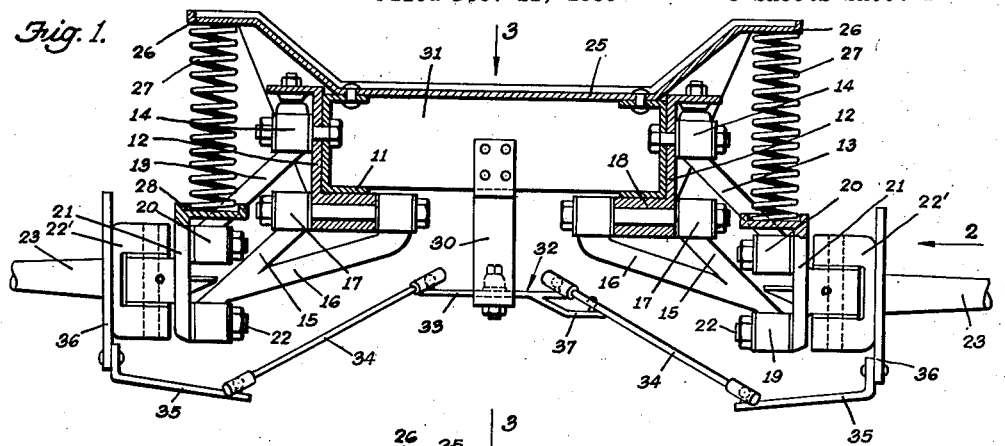
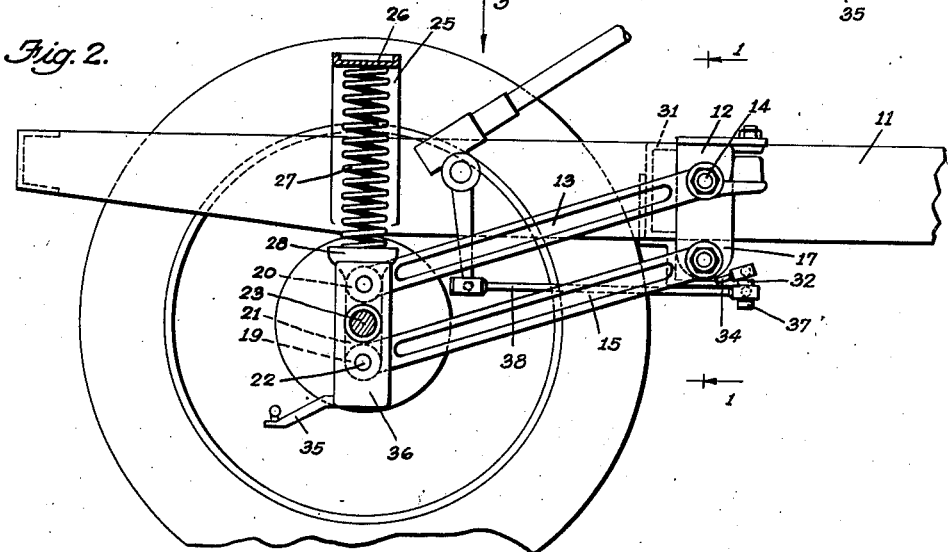
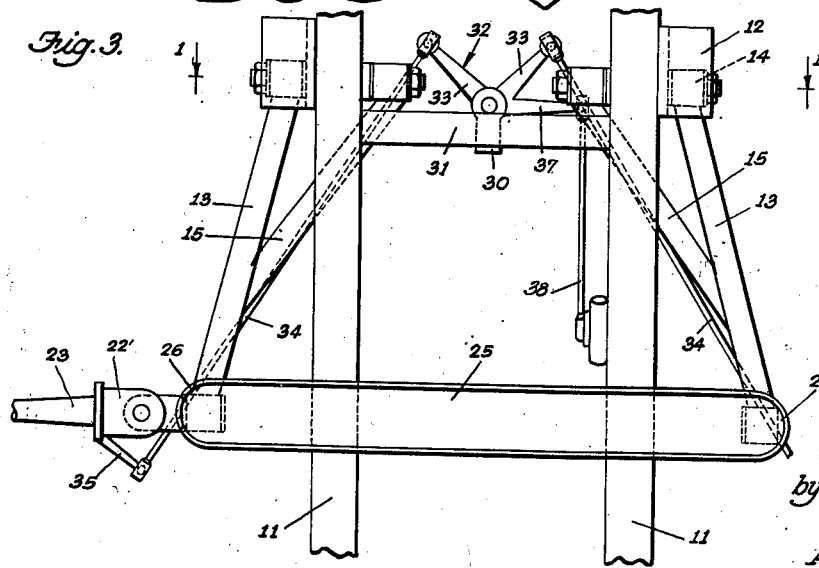
Inventor
C. Opolo
by Hazard and
Miller
Attorneys.

July 4, 1939.  C. OPOLO  2,164,470
ANTIVIBRATION SUSPENSION AND STEERING GEAR FOR VEHICLES
Filed Dec. 11, 1935   3 Sheets-Sheet 2

Inventor
C. Opolo
by Hazard and Miller
Attorneys.

July 4, 1939.  C. OPOLO  2,164,470
ANTIVIBRATION SUSPENSION AND STEERING GEAR FOR VEHICLES
Filed Dec. 11, 1935  3 Sheets-Sheet 3
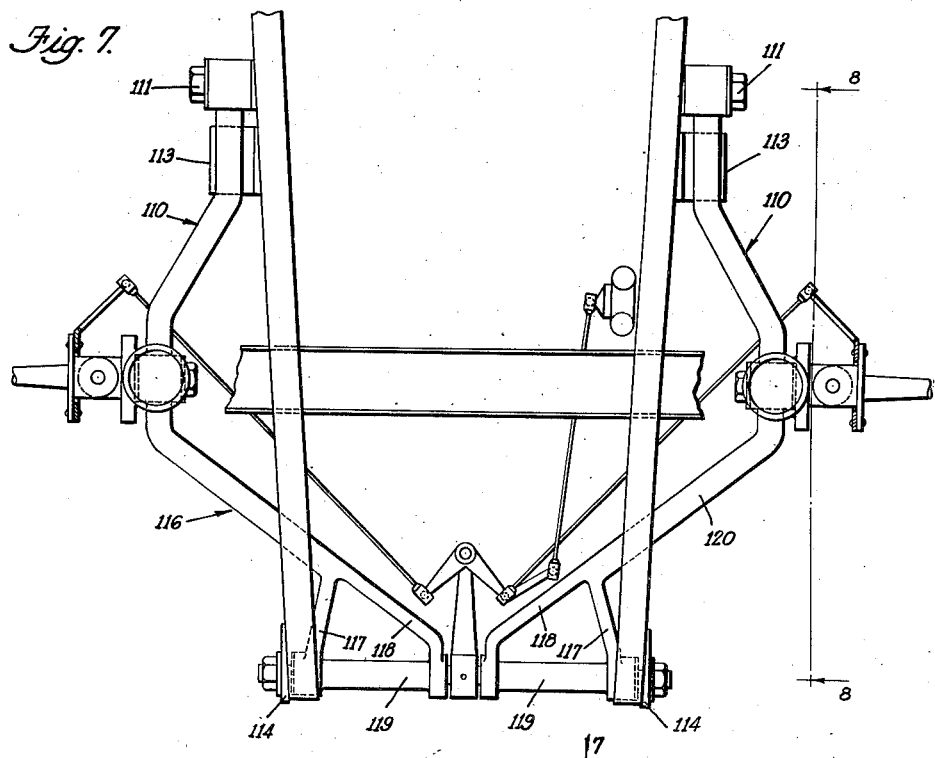
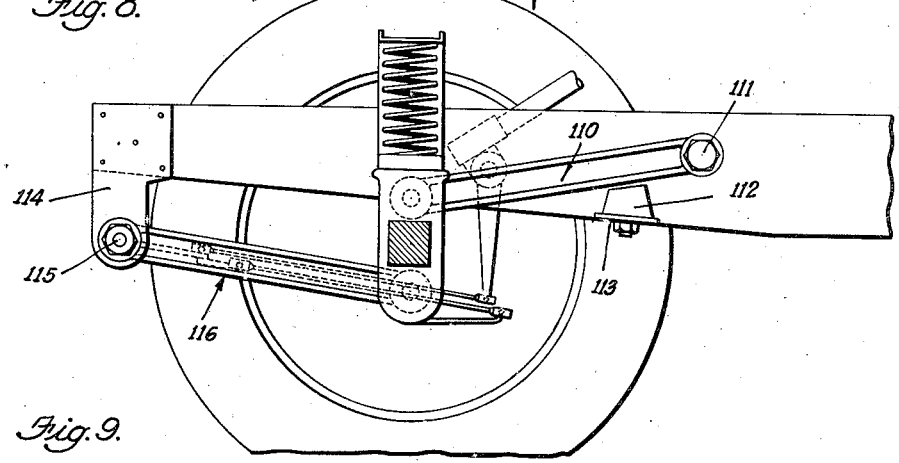
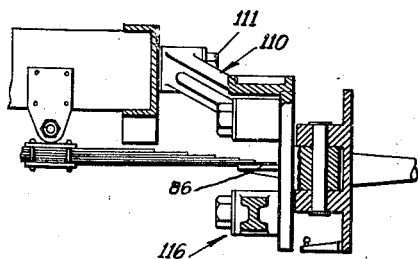
Inventor
C. Opolo
by Hazard and Miller
Attorneys.

Patented July 4, 1939

2,164,470

UNITED STATES PATENT OFFICE 2,164,470

ANTIVIBRATION SUSPENSION AND STEERING GEAR FOR VEHICLES

Charles Opolo, Culver City, Calif.

Application December 11, 1935, Serial No. 53,917

15 Claims. (Cl. 280—95)

My invention relates to an independent spring mounting and a pivotal connection of the steering wheels of a vehicle to the vehicle frame or chassis.

My invention also comprehends the steering connection having a central pivotal connection with diverging links pivoted thereto, these links being connected to steering arms so that no matter how the wheels may be moving up and down one relative to the other, there will always be a positive and accurate steering connection from one wheel to another.

A charactertic feature of my invention in regard to the independent spring mounting for the wheels resides in using arms pivotally connected to the frame of the vehicle and having the free ends of these arms pivotally connected to a type of knuckle bracket, the knuckle bracket carrying the spindle on which the steering wheels are mounted. Therefore as the axles work up and down the links have a pivotal motion; the axis of pivoting of the arms on the vehicle being directly transverse to the frame and therefore the transverse axis of the pivot knuckles is always maintained exactly transverse to the vehicle.

Another object and feature of my invention consists of having the pivoted arms located at different elevations in their connection to the vehicle frame and also to the knuckle brackets in order to maintain a parallel motion of the knuckle brackets due to uneven road surfaces. In one form of my invention the arms may be pivotally connected rearwardly of the axles. Thus the free ends of the arms extend forwardly and the knuckle brackets thus form a vertical side of a changeable quadrangle.

In another form of my invention the fixed ends of the links may be connected at the forward end of the vehicle frame, the free ends thus trailing rearwardly and are connected to the knuckle brackets.

In another form of my invention the links for each knuckle bracket may be connected one forwardly and one rearwardly on the vehicle frame in reference to the knuckle bracket. Therefore the knuckle bracket will have a slight tilting motion in the up and down action of the wheels.

Another object and feature of my invention is in the spring mounting of the knuckle brackets in relation to the vehicle frame. This may be by coiled compression springs or by leaf springs, the leaf springs being preferably arranged at a diagonal angle in reference to the axis of the vehicle and may be of a cantilever type. If desired, the coil springs may be omitted and the spring action be by the diagonal leaf springs alone and/or transverse springs.

My invention is illustrated in the accompanying drawings, in which:

Fig. 1 is a transverse section on the line 1—1 of Figs. 2 or 3 taken in the direction of the arrows with additional parts broken away.

Fig. 2 is a side elevation taken in the direction of the arrow 2 of Fig. 1.

Fig. 3 is a plan taken in the direction of the arrows 3 of Figs. 1 or 2.

Fig. 7 is a plan of a further modification of my invention taken in the direction of the arrow 7 of Fig. 8, showing the axle mounting arms pivotally connected to a forward and a rearward position on the vehicle frame.

Fig. 8 is a longitudinal section on the line 8—8 of Fig. 7 taken in the direction of the arrows.

Fig. 9 is a partial section showing a modified form of spring, this being a transverse cantilever leaf spring connection.

Figure 4:
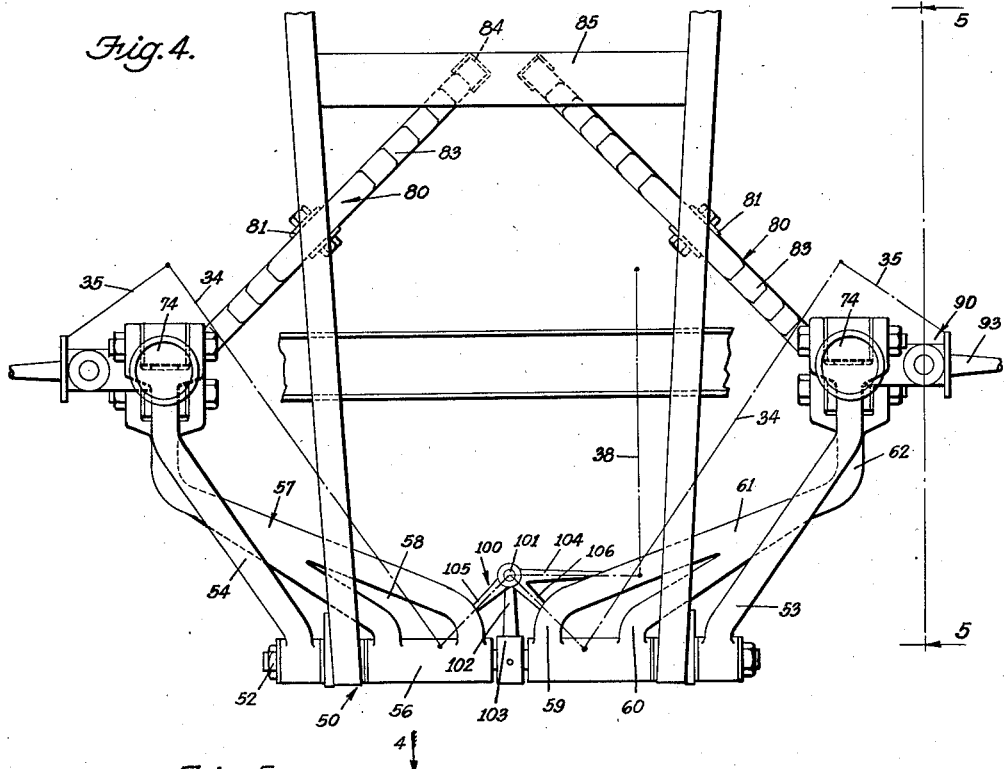
Fig. 4 is a plan of a modification as if taken in the direction of the arrow 4 of Fig. 5, showing the arms pivotally connected to a forward position of the vehicle frame.

I use a standard automobile frame construction having two channel form of side beams 11. On each beam there is a substantial angle bracket 12. An upper axle arm 13 is pivoted at 14 to the upper portion of the bracket 12 and a forked axle arm having the branches 15 and 16 is pivotally connected to the lower portion of the same bracket, these branches having hubs 17, the outer branch 15 being located outside of the bracket and the inner branch 16 inside of the bracket. These branches at the fulcrum to the frame are separated by a spacer hub 18. The outer end of the forked arms has a swivel hub 19 and the upper arm 13 terminates in a swivel hub 20. Both of these hubs are pivotally connected to a knuckle bracket 21 having pivot bolts 22. Thus there is in effect a parallel arm connection between the bracket 12 on the side frames to the knuckle bracket 21. Each knuckle bracket forms a knuckle connection 22' for the wheel axle spindles 23.

The spring mounting uses a transverse channel or similar member 25 conected to the upper flange of the channels and has an upper seat 26 for a coil spring 27. Each knuckle bracket 21 has a horizontal spring seat 28 which forms the lower seat for the spring 27. Thus as the wheel moves up and down the arm assemblies 13 being the upper arm and 15 and 16 the lower arms, swing upwardly or downwardly on their pivot connections to the frame, the movement may be resisted by the spring 27. It will be noted that the lower forked arm 15 and 16 being spaced apart at the vehicle frame form in effect a triangular arm connection to the swivel bracket, thus effectively resisting twisting forces.

The steering connection utilizes a suspension strap 30 depending from a cross member 31 and this strap forms the pivot for a bell crank 32, the pivot being vertical. The bell crank has two similar arms 33 to each of which is connected by a swivel joint a link 34. Each link at its forward end is connected to a steering arm 35 by a swivel and each steering arm is attached to a disk 36 or similar construction secured to the moving portion of the knuckle 22 and the axle spindle 23. A third arm 37 is integral with the bell crank and is operated by a link 38 actuated by any suitable steering mechanism such as now used in the usual steering column.

By this construction of steering mechanism, either side may work up and down following the action of the wheel on one side of the vehicle, without affecting the steering action on the other side of the vehicle in which the wheel may be acting entirely different from the other wheel. Therefore both of these steering wheels may have free up and down movement independent of each other, the movement being transmited to the vehicle frame through the spring and further that in the steering of the vehicle no matter whether running in a straight line or turning to either direction, is not affected by the up and down action of either or both wheels.

Figure 5:
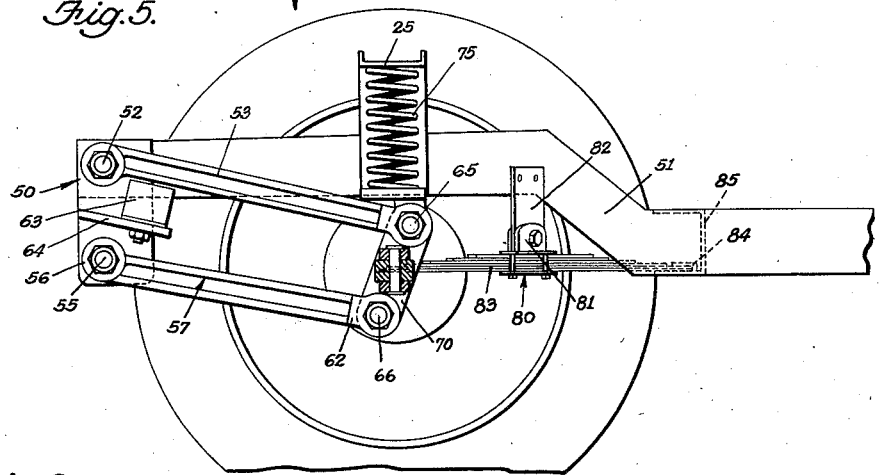
Fig. 5 is a longitudinal section on the line 5—5 of Fig. 4 in the direction of the arrows.
Figure 6:
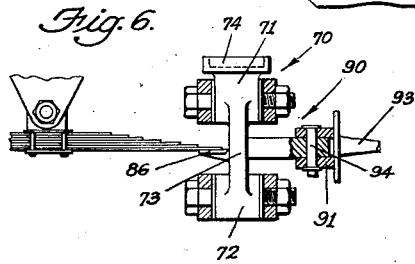
Fig. 6 is a detail showing the mounting of the leaf springs on the knuckle brackets.

In the construction of Figs. 4 and 5, there are substantial brackets 50 connected to the forward end of the vehicle frame, this frame being shown as of the drop side type with a drop section 51. An upper pair of studs 52 are connected to the upper portions of the brackets, preferably passing through or being connected to the forward portion of the vehicle frame and to these studs are pivoted the upper arms 53 which extend rearwardly on opposite sides of the vehicle frame, these arms also having an outward bend indicated at 54. Such arms are preferably attached to the vehicle frame outside of the side members of the frame. A long stud or bolt 55 connects across the lower portions of the brackets 50, thus forming a connection across the vehicle frame and below the studs 52. Mounted on these studs there are two substantial hubs 56 having the arms 57 formed integral therewith. These arms have a split 58 at their inner ends, thus defining two spaced portions 59 and 60. They pass underneath the side member of the vehicle frame and have a decided outward bend as indicated at 61 (note Fig. 4) and a rearwardly extending section 62 adjacent their outer portion. A buffer block formed of rubber indicated at 63 is mounted on a plate 64 secured to each bracket and engages the upper arms 53 to restrain their downward motion. The ends 65 and 66 of the upper and lower arms respectively are pivotally connected to a knuckle bracket 70 (note Fig. 6). This knuckle bracket has thus upper and lower hubs 71 and 72 connected by a web section 73. A spring seat 74 is connected to the upper hub 71 and forms the lower mounting for a coil spring 75. The upper end of the spring is mounted in a transverse channel member 25 similar to that shown in Figs. 2 and 3 or an equivalent structure.

With this form of spring mounting I may also use a leaf spring 80, this being shown as having a clamp 81 secured to a bracket plate 82, connected each to one of the side members of the vehicle frame; the stack of leaves 83 being secured in the clamp having a spring seat 84 at the rear end on a transverse member 85 of the vehicle frame and engaging a spring seat 86 secured to the web 73 of the knuckle bracket 70.

The stub axles 90 are formed integral with the knuckle brackets, being preferably formed integral with the webs 73 and have the knuckles 91 of the spindle axles 93 pivotally connected thereto by the vertical spindle pins 94, thus allowing the wheels to swivel in steering. It will be noted in this construction that on account of the arms 53 and 57 being substantially parallel, that the steering pivot 94 will always occupy a vertical position in the up and down movement of the wheels.

The steering mechanism is substantially the same in principle as shown in Figs. 1, 2 and 3, except in this case a bell crank 100 is pivotally connected at 101 to an arm 102 securely attached by a hub member 103 to the bolt 55 or other structure connecting across the front of the vehicle. One arm 104 of the bell crank connects to a steering link such as 38, the other arms 105 and 106 of the bell crank connect to the diverging links 34 which lead to the steering arms 35; this connection operating somewhat as shown in Figs. 1, 2 and 3.

In the construction of Figs. 7, 8 and 9, rear arms 110 are pivotally connected to the side members of the vehicle frame by pivot studs 111, these being limited in their downward motion by bumper members 112 mounted on bumper plates 113 secured to each side member of the frame. At the forward end of each frame there is a substantial bracket 114 extending downwardly and having a pivot bolt or rod 115 connecting the brackets. On this pivot bolt there are connected the forward pivoted arms 116 each having an inner split end with sections 117 and 118 connected to a hub 119 on the bolt or rod 115. The main portions 120 of these arms pass outwardly underneath the side members of the vehicle frame as a single member.

Fig. 9 shows a modified construction to that of Figs. 7 and 8 in that a transverse leaf spring is utilized. The illustration shows one end of the leaf spring engaging a spring seat such as 86 on one knuckle bracket, the opposite end of the spring, not shown, will engage a similar spring seat on the opposite knuckle bracket. The center of the spring is pivoted on a transverse member of the frame, such pivot extending longitudinally.

Various changes may be made in the principles of my invention without departing from the spirit thereof as defined by the appended claims.

I claim:

1. A vehicle having a frame with two side members, an upper arm on each side of the frame and having a transverse pivotal connection to a side member at an upper position thereon, two secondary and lower arms each transversely pivotally connected to a side member in a horizontal plane below the pivotal connection of the first arm, the secondary arms having an elongated pivot with at least one portion of the arm located between the side members and a portion of the lower arms extending underneath the side member, a knuckle bracket on each side of the frame, the upper and lower arms on each side having upper and lower pivotal connections to the knuckle bracket, each knuckle bracket having a steering knuckle and a wheel spindle connected thereto and a spring connection between the knuckle bracket and the vehicle frame, each spindle being located in a horizontal plane between the pivots of the arms to its knuckle bracket.

2. A vehicle as claimed in claim 1, a steering mechanism including a bracket connected to the vehicle frame, a single bell crank having two arms pivoted on the bracket, arms connected to each wheel spindle, a steering link pivotally connected between a bell crank arm and a spindle arm, the said latter links occupying a plane substantially the same as that of the lower arms pivoted to the frame, and means to actuate the bell crank.

3. A vehicle as claimed in claim 1, the spring comprising a leaf spring having one end bearing on a seat connected to the knuckle bracket, the other end of the spring being connected to the vehicle frame and means pivotally attaching the center of the spring to the vehicle frame.

4. A vehicle as claimed in claim 1, the spring including a leaf spring having a bearing at its outer end on a knuckle bracket and having its center portion connected to the vehicle frame and its opposite end having a bearing on the vehicle frame, there being a spring on each side of the vehicle arranged diagonally as to the axis of the vehicle.

5. In a vehicle, a frame having two side members, an upper and a lower arm each having a pivotal connection to a side member, the said pivots being transverse, the lower arm having an elongated pivot with at least one portion located between the two side members and a portion of the lower arm passing underneath its adjacent side member, a knuckle bracket on each side of the vehicle, each pair of arms at its end being pivotally connected to the knuckle bracket, the upper arm to an upper portion and the lower arm to a lower portion of the knuckle bracket, a wheel spindle pivotally connected to each knuckle bracket, each spindle being located in a horizontal plane between the pivots of the arms to its knuckle bracket, each knuckle bracket having a spring seat, a complementary seat for a spring connected to the vehicle frame and a spring between each pair of seats.

6. In a vehicle as claimed in claim 5, the side members of the frame extending forwardly of the knuckle bracket and the arms on each side of the frame being connected adjacent the forward end of the side members, the knuckle bracket being thus located rearwardly of the pivotal connection of the arms to the frame.

7. In a vehicle as claimed in claim 5, the upper arms on each side of the vehicle being pivotally connected to its adjacent side member rearwardly of the knuckle bracket, each side member extending forwardly of the knuckle bracket and the lower arm on each side being pivotally connected adjacent the forward end of each side member.

8. In a vehicle, a frame having side members, an upper arm pivotally connected to each side member on the outside thereof and in an upper position, a lower arm on each side of the vehicle pivotally connected to a side member, the said pivot being vertically below the pivot of the first arm, the pivot of the lower arms being extended inwardly between the side members whereby a portion of the lower arm passes underneath its adjacent side member, a knuckle bracket on each side of the vehicle, the free ends of the arms on the same side of the vehicle being pivotally connected to the knuckle bracket, the upper arm to an upper portion and the lower arm to a lower portion, a spring between each knuckle bracket and the vehicle frame and a wheel spindle operatively connected to each knuckle bracket, each spindle being located in a horizontal plane between the pivots of the arms to its knuckle bracket.

9. In a vehicle as claimed in claim 8, the said frame members extending forwardly of the knuckle bracket and the arms being pivotally connected to the forward ends of the side members.

10. In a vehicle, a frame having side members, a first pair of arms having a pivotal connection to the side members at the end thereof, such pivot being between the side members and each arm passing outwardly below a frame member, a second pair of arms pivotally connected to the frame members, one on each side of the vehicle at a rearward portion of the side members, a pair of knuckle brackets each having a pivotal connection to the free ends of the adjacent arms, the rearward arms being pivotally connected to an upper portion of the bracket and the forward arms to a lower portion of the bracket, and a spring between each knuckle bracket and the vehicle frame, each spindle being located in a horizontal plane between the pivots of the arms to its knuckle bracket, a steering connection comprising an arm connected to the forward end of the vehicle frame, a bell crank pivotally mounted thereon, steering spindles connected to each knuckle bracket, a link, an arm connection between each arm of the bell crank and a steering spindle, each link operating substantially in the same plane as the pair of arms passing underneath the side frame members.

11. In a vehicle, a frame having side members, a knuckle bracket on the outside of each side member, a pair of upper and lower arms pivoted to each side member and having an upper and lower pivot connected to a knuckle bracket, a leaf spring having a bearing on each knuckle bracket and operatively connected to the vehicle frame, each spring extending rearwardly diagonally from its knuckle bracket.

12. In a vehicle having a chassis frame with side members, a pair of arms transversely pivotally connected to each side member, a knuckle bracket on each side of the vehicle, the arms on each side being transversely pivotally connected to an upper and a lower part of the knuckle bracket, a steering knuckle pivotally connected to each knuckle bracket, a wheel spindle connected to each steering knuckle, each spindle being located in a horizontal plane between the pivots of the arm to its knuckle bracket, a steering mechanism including a single bracket connected to the vehicle frame, a single bell crank having two arms and pivoted on the bracket, an arm connected to each wheel spindle, two steering links each pivotally connected between a bell crank arm and a spindle arm, the said links occupying a plane substantially the same as that of the lower arms pivoted to the knuckle bracket and means to actuate the bell crank.

13. In a vehicle having side frame members with upper and lower arms on each side having a transverse pivotal connection to the frame member, and the free ends of each arm each transversely pivotally connected to a knuckle bracket with steering knuckles and spindle axles connected to each knuckle, combined with a steering mechanism including a single bracket connected to the vehicle frame, a single bell crank having two arms and pivoted on the bracket, arms connected to each wheel spindle, two steering links each pivotally connected between a bell crank arm and a spindle arm, the said latter two links occupying a plane substantially the same as that of the lower arms pivoted to the frame, and means to actuate the bell crank.

14. In a vehicle having side frame members with upper and lower arms transversely pivotally connected to each frame member, at least one of said arms being pivoted adjacent the forward end of the frame members, the free ends of each pair of arms being transversely pivotally connected to a knuckle bracket, one of the arms of each pair being above and the other located below in their connections to the knuckle bracket and one arm of each pair passing below its adjacent side member, a steering connection comprising a single bracket connected to the forward end of the vehicle frame, a single bell crank pivotally mounted thereon and having two arms, steering spindles connected to each knuckle bracket, two links each pivoted between an arm of the bell crank and a steering spindle, each link operating substantially in the same plane as the pair of arms passing underneath the side frame members.

15. In a vehicle, a chassis frame having side members, a first pair of arms having a pivotal connection, one to each member at a forward end thereof, the said arms being located in a plane below that of the side members, a second pair of arms pivotally connected to the frame, one on each side, a knuckle bracket on each side with the arms on a side pivotally connected thereto, a steering connection comprising a single bracket connected to the forward end of the vehicle frame, a single bell crank pivotally mounted thereon having two arms, steering spindles connected to each knuckle bracket, two links each pivoted between an arm of the bell crank and a steering spindle, each link operating substantially in the same plane as the pair of arms positioned underneath the side frame members.

CHARLES OPOLO.